United States Patent [19]
Webster et al.

[11] Patent Number: 6,160,057
[45] Date of Patent: Dec. 12, 2000

[54] POLYMERS OF 3-BUTENE ESTERS, THEIR PREPARATION AND USE

[75] Inventors: Dean Charles Webster; Allen Lynn Crain; Chadwick Edward Marlow, all of Kingsport, Tenn.

[73] Assignee: Eastman Chemical Company, Kingsport, Tenn.

[21] Appl. No.: 09/541,989

[22] Filed: Apr. 3, 2000

Related U.S. Application Data

[60] Division of application No. 09/031,825, Feb. 27, 1998, which is a continuation-in-part of application No. 08/956,533, Oct. 23, 1997.

[51] Int. Cl.⁷ .................................................. C08F 8/32
[52] U.S. Cl. .................. 525/379; 525/328.9; 525/374; 525/378; 526/333
[58] Field of Search ........................... 525/379, 378, 525/374, 328.9

[56] References Cited

U.S. PATENT DOCUMENTS

| | | |
|---|---|---|
| 2,504,082 | 4/1950 | Neher et al. . |
| 2,680,109 | 6/1954 | Stevens et al. . |
| 2,954,366 | 9/1960 | Pellon . |
| 3,157,623 | 11/1964 | Braun ................................... 526/323.2 |
| 4,916,255 | 4/1990 | Kobayashi et al. . |
| 5,051,529 | 9/1991 | Witzeman et al. . |
| 5,296,530 | 3/1994 | Bors et al. . |
| 5,349,026 | 9/1994 | Emmons et al. . |
| 5,484,849 | 1/1996 | Bors et al. . |
| 5,484,975 | 1/1996 | Itatsu . |
| 5,525,662 | 6/1996 | Lavoie et al. . |
| 5,539,073 | 7/1996 | Taylor et al. . |
| 5,623,086 | 4/1997 | Perri et al. . |

FOREIGN PATENT DOCUMENTS

| | | |
|---|---|---|
| 0 492 847 A2 | 12/1991 | European Pat. Off. . |
| 0 703 250 A1 | 3/1996 | European Pat. Off. . |

OTHER PUBLICATIONS

Evans et al., *J. Chem. Soc.* 248 (1949).
Clemens, *Chemical Reviews*, 86:241–318 (1986).
Schildknecht, *Allyl Compounds and Their Polymers*, Wiley–Interscience (1973).
Pichot et al., *J. Polym. Sci.: Polym. Chem. Ed.*, 19:2619–2633 (1981).
Rector et al., *J. Coatings Technology*, 61:31–37 (1989).
Moszner et al., *Polymer Bulletin* 32:419–426 (1994).
*Beilsteins Handbuch Der Organischen Chemie*, p. 324 (1960).

*Primary Examiner*—Fred Zitomer
*Attorney, Agent, or Firm*—Rose M. Allen, Esq.; Harry J. Gwinnell

[57] ABSTRACT

The specification describes various polymers having monomer of formula (I):

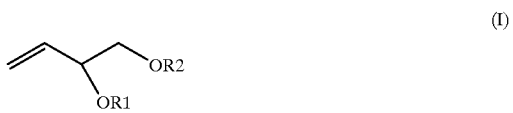

(I)

In formula (I), R1 and R2 are, independently, hydrogen, a $C_1$–$C_{24}$ alkyl group, an aromatic or heteroaromatic group, a $C_3$–$C_8$ cycloalkyl or $C_2$–$C_7$ heterocycloalkyl group, or a —C(O)R3 group. Preferably R1 and R2 are both a a —C(O)R3 group where R3 which can the same of different is selected from the group consisting of a $C_1$–$C_{24}$ alkyl group, an aromatic or heteroaromatic group, a $C_3$–$C_8$ cycloalkyl or $C_2$–$C_7$ heterocyclic group; or a —$CH_2$—C(O)—R4 group in which R4 is a $C_1$–$C_6$ alkyl group. At lease one of R1 and R2 is a —C(O)R3 group. The polymer may be a homopolymer or a copolymer containing other ethylenically unsaturated monomers. The polymer may be used in a variety of coating compositions such as inks, adhesives, paints and films. Unique monomers where both R1 and R2 are acetoacetyl groups and novel monomers where R2 is an acetoacetyl group are also described.

7 Claims, No Drawings

POLYMERS OF 3-BUTENE ESTERS, THEIR PREPARATION AND USE

CROSS REFERENCE TO RELATED APPLICATION

This is a divisional of copending application Ser. No. 09/031,825 filed on Feb. 27, 1998 which is a continuation-in-part of application Ser. No. 08/956,533 filed Oct. 23, 1997.

BACKGROUND OF THE INVENTION

1. Field of the Invention

The present invention relates to polymers resulting from polymerizing ethylenically unsaturated esters derived from 3,4-epoxy-1-butene or epoxybutene. The polymers may be homopolymers or copolymers containing other ethylenically unsaturated monomers. The polymers of the invention may be used in a variety of coating compositions such as inks, adhesives, paints, and films.

2. Description of the Related Art

The ring opening chemistry of epoxides is well known. (Evans et al., *J. Chem. Soc.* 248 (1949)). Opening an epoxide ring with a nucleophile can create one hydroxyl moiety or, depending on reaction conditions, two hydroxyl moieties. The hydroxyl groups can undergo further reaction. The hydroxyl groups can, for example, be converted to esters by reaction with carboxylic acids. Hydroxyl groups can also be converted to acetoacetic esters (Clemens, R. J., *Chemical Reviews*, 86:241–318 (1986); Witzeman, J. S., U.S. Pat. No. 5,051,529 (1991)).

Reacting an epoxide group with an acid anhydride can yield a disubstituted ester derivative (U.S. Pat. No. 5,623,086). Reacting an epoxide with an alcohol results in the formation of a hydroxy ether and is well known in the literature. The remaining hydroxyl group may be further derivatized using, for example, carboxylic acids or anhydrides to form esters using methods well known to those skilled in the art.

The ring opening reaction of 3,4-epoxy-1-butene or epoxybutene with hydroxide base yields an ethylenically unsaturated diol, 3-butene-1,2-diol, having the following structure:

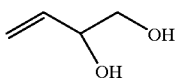

The two hydroxyl moieties provide a possible means by which further functionality may be added to the polymer. For example, U.S. Pat. No. 2,504,082 describes the synthesis of the propenyl ester of 1-hydroxy-2-methoxy-3-butene. U.S. Pat. No. 4,916,255 describes the synthesis of the methacrylate ester of 1-hydroxy-2-methoxy-3-butene.

However, the polymerization of ethylenically unsaturated esters such as allyl esters has proven difficult. Homopolymerization of allyl esters such as allyl acetate is sluggish and results in a low molecular weight polymer. Allyl esters will also only copolymerize with a few selected unsaturated monomers such as vinyl esters or maleic anhydride (C. E. Schildknecht, *Allyl Compounds and Their Polymers*, Wiley-Interscience, 1973).

Similarly, only a few monomers are known that will copolymerize effectively with vinyl esters. For a number of applications, particularly coatings, poly(vinyl acetate) needs to be modified with other monomers to provide a lower glass transition temperature, $T_g$. Vinyl esters such as vinyl neodecanoate have been shown to be useful in lowering the $T_g$ of poly(vinyl acetate), but are expensive. Other vinyl esters that have also been shown useful in reducing the $T_g$ of poly(vinyl acetate) include butyl acrylate and 2-ethyl hexyl acrylate. Copolymers of vinyl acetate and butyl acrylate are heterogeneous due to the differences in reactivity (e.g., C. Pichot, M. F. Llauro, Q. T. Pham, *J. Polym. Sci.: Polym. Chem. Ed.*, 19, 2619–2633 (1981)). However, monomers that will copolymerize well with vinyl esters such as vinyl acetate and result in polymers with functional groups available for post-polymerization are not known in the art.

Therefore, a need exists in the art for functionalized ethylenically unsaturated esters which may be used as monomers and undergo facile polymerization. Moreover, the needed monomers should not only be able to form high molecular weight polymers but also be able to copolymerize with a variety of other ethylenically unsaturated monomers. It would also be desirable that such a functionalized ethylenically unsaturated monomer contain finctionality capable of surviving polymerization and undergoing further post-polymerization reaction.

SUMMARY OF THE INVENTION

The invention provides a polymer formed by the polymerization of an ethylenically unsaturated monomer and a monomer of formula (I):

where R1 and R2 are both an ester group. The invention also provides coating compositions containing such polymers.

The invention further provides a method of making a polymer containing a monomer of formula (I). The method involves the polymerization, such as free-radical polymerization, of a monomer of formula (I) with an ethylenically unsaturated monomer.

The invention still further provides a enamine functional polymer resulting from the reaction of an amine and the polymerization product of a monomer of formula (I) and an ethylenically unsaturated monomer. In formula (I), at least one of R1 and R2 is an acetoacetyl group. The invention also provides a method of making the enamine functional polymers.

DETAILED DESCRIPTION OF THE INVENTION

One embodiment of the invention is a polymer resulting from polymerization of a monomer of formula (I):

and, optionally, an ethylenically unsaturated monomer. Mixtures of these monomers together or with other ethylenically unsaturated monomers may be used to prepare polymers of the invention. Preferably, the polymerization is a free-radical polymerization.

In formula (I), R1 and R2 are, independently, hydrogen, a $C_1$–$C_{24}$ alkyl group, an aromatic or heteroaromatic group, a $C_3$–$C_8$ cycloalkyl or $C_2$–$C_7$ heterocycloalkyl group, or a —C(O)R3 group. R3 is a $C_1$–$C_{24}$ alkyl group, an aromatic or heteroaromatic group, a $C_3$–$C_8$ cycloalkyl or $C_2$–$C_7$ heterocyclic group, or a —$CH_2$—C(O)—R4 group where R4 is a $C_1$–$C_6$ alkyl group. In the monomers of formula (I), at least one of R1 and R2 is a —C(O)R3 group forming an ester. Preferably, when R1 and R2 are both a —C(O)R3 group, R3 is a —$CH_2$—C(O)—R4 where R4 is methyl group, i.e. an acetoacetyl group. When R1 is a methyl group, preferably, R2 is either an acetyl group or an acetoacetyl group. In another preferred embodiment, R1 and R2 are both a —C(O)R3 group where R3 can be the same or different. Preferably for R1 and R2, R3 is the same and is an ethyl, propyl, or 3-heptyl group to form respectively, 3-butene-1, 2-dipropyl ester, 3-butene-1,2-dibutyl ester, and 3-butene-1, 2-di-2-ethylhexyl ester.

The alkyl group of R1, R2 and R3 may be a linear or branched alkyl group. Preferably, the alkyl group is a $C_1$–$C_{12}$ alkyl group. More preferably, the alkyl group is, for example, a methyl, ethyl, propyl, isopropyl, butyl, isobutyl, t-butyl, pentyl, neopentyl, hexyl, heptyl or 3-heptyl group. The alkyl group of R4 may also be a linear or branched alkyl group. Preferably, R4 is a $C_1$–$C_4$ alkyl group. More preferably, R4 is, for example, a methyl, ethyl, or propyl group.

Preferred aromatic and heteroaromatic groups described here include, but are not limited to, phenyl, furanyl, pyrrolyl, isopyrrolyl, thienyl, napthyl, pyridinyl, pyranyl, and benzyl. Preferred cycloalkyl groups described here are $C_3$–$C_6$ cycloalkyl groups. More preferably, the cycloalkyl group is, for example, a cyclopropyl, cyclopentyl, or cyclohexyl group. The heterocycloalkyl groups described here are preferably $C_2$–$C_5$ heterocycloalkyl groups. More preferably, the heterocycloalkyl groups is, for example, an oxiranyl, aziridinyl, imidazolidinyl, pyrazolidinyl, piperidinyl, piperazinyl, or morpholinyl group.

In addition, an alkyl group, aromatic or heteroaromatic group, or a cycloalkyl or heterocyclic group may be substituted with groups such as, but not limited to, nitro, bromo, chloro, fluoro, hydroxy, and alkoxy groups. An aromatic or heteroaromatic group or cycloalkyl or heterocycle may also be substituted with a $C_1$–$C_4$ alkyl group. Possible heteroatoms for heteroaromatic groups include nitrogen, oxygen, and sulfur.

The ethylenically unsaturated monomer can be any monomer which contains at least one ethylenically unsaturated group allowing it to be copolymerized with monomers of formula (I). Such monomers include, for example, allylic compounds, vinylic compounds, styrenic compounds, α,β-unsaturated compounds, alkenes, acrylic compounds and the like. Examples of suitable ethylenically unsaturated monomers include, but are not limited to, vinyl acetate, vinyl pivalate, vinyl neodecanoate, vinyl neononanoate, vinyl neoundecanoate, vinyl crotonate, vinyl 2-ethyl hexanoate, vinyl propionate, 4-vinyl-1,3-dioxolan-2-one; ethylene, epoxy butene; vinyl chloride, vinyl methacrylate; allyl alcohol, allyl chloride, allyl acetate, allyl methacrylate, di-allylmalonate; dimethyl maleate, diethyl maleate, di-n-butyl maleate, di-octyl maleate, maleic anhydride; 3-butene-1,2-diacetate, 3-butene-1,2-dipropionate, 3-butene-1,2-dibutyrate, 3-butene-1,2-dibenzoate; dimethyl itaconate, itaconic anhydride; crotonic acid and its esters, for example, $C_1$–$C_{18}$ alkyl crotonates; acrylonitrile; acrylamide, methacrylamide, butyl acrylamide, ethyl acrylamide; acrylic acid; methyl acrylate, ethyl acrylate, ethylhexyl acrylate, propyl acrylate, butyl acrylate, isobutyl acrylate, hydroxy ethyl acrylate, hydroxy propyl acrylate, lauryl acrylate, octyl acrylate, iso-octyl acrylate; methacrylic acid; methyl methacrylate, ethyl methacrylate, ethylhexyl methacrylate, propyl methacrylate, butyl methacrylate, isobutyl methacrylate, hydroxy ethyl methacrylate, hydroxy propyl methacrylate, octyl methacrylate, glycidyl methacrylate, carbodiimide methacrylate, methoxybutenyl methacrylate, isobornyl methacrylate, hydroxybutenyl methacrylate, isopropenyl methacrylate, iso-octyl methacrylate, cylcoaliphaticepoxy methacrylate; ethylformamide; styrene and α-methyl styrene. Vinyl esters of neononanoic acid, neodecanoic acid and neoundecanoic aicd are available from Shell Chemicals and are known as VEOVA-9, VEOVA-10, and VEOVA-11, respectively ("Introduction to VEOVA Monomers," a Shell Chemicals publication). Preferably the ethylenically unsaturated monomer is the vinyl ester, vinyl acetate.

Another embodiment of the invention is a method of making a polymer of the invention. The method involves polymerizing, preferably under free-radical polymerization conditions, a monomer of formula (I) as described above and, optionally, an ethylenically unsaturated monomer, also as described above. Free radical polymerization of monomer (I) is achieved under conditions known by those skilled in the art. The polymerization is conducted in the presence of a free radical generating initiator. The free radical polymerization process may be a bulk, solution, emulsion, or suspension process. Preferably, the free radical polymerization process is a semi-batch solution or emulsion process.

The free radical generating initiator may be any conventional free radical polymerization initiator. Examples of suitable initiators include, but are not limited to, azo(bis isobutyronitrile), benzoyl peroxide, di-t-butyl peroxide, t-butyl peroctoate, t-amyl-peroxy-2-ethyl hexanoate, and the like. Quantitative conversion of monomer (I) to the corresponding polymer can be improved by using a more active free radical initiator, i.e. one with a shorter half-life, conducting the polymerization at a higher temperature, or using a higher concentration of initiator.

If a solvent is used to carry out the polymerization process, solvents which can solubilize both monomer (I) and the resulting polymer are preferred. Examples of suitable solvents include, but are not limited to, xylene, toluene, methyl amyl ketone, ethyl ethoxy propionate, propylene glycol monomethyl ether, ethylene glycol butyl ether, and the like. Preferably, the solvent is either a glycol ether or a glycol ether ester.

Polymerization of a monomer of formula (I), optionally with another ethylenically unsaturated monomer, occurs through the ethylenically unsaturated group of each monomer. The polymer of the invention may contain at least one pendant functional moiety through which further chemistry can be conducted. The pendant functional moiety may be any moiety which can undergo further reactions including, for example, reacting with crosslinkers to form thermoset materials. Preferably, the pendant functional moiety is a hydroxyl group, an acetoacetoxy group, or a combination thereof.

A crosslinker used with a polymer of the invention may be any material capable of reacting with an active hydrogen containing resin and include those well known in the art. Preferably, the resin is a urea-formaldehyde, a melamine-formaldehyde, or an isocyanate resin.

Polymers of the invention are generally thermoset polymers and can be used in a variety of coating compositions such as paints, architectural coatings, maintenance coatings, industrial coatings, automotive coatings, textile coatings, inks, adhesives, and coatings for paper, wood, and plastics, and the like as described, for example, in U.S. Pat. No. 5,539,073 incorporated in its entirety herein by reference. Accordingly, the invention relates to such coating composition containing a polymer of the invention. The coating composition may be solvent-based or water-based. The polymers of the invention may be incorporated in those coating compositions in the same manner as known polymers and used with the conventional components and or additives of such compositions. The coating compositions may be clear or pigmented.

Upon formulation, a coating composition containing a polymer of the invention may then be applied to a variety of surfaces, substrates, or articles, e.g., paper, plastic, steel, aluminum, wood, gypsum board, or galvanized sheeting (either primed or unprimed). The type of surface, substrate, or article to be coated generally determines the type of coating composition used. The coating composition may be applied using means known in the art. For example, a coating composition may be applied by spraying or by coating a substrate. In general, the coating may be dried by heating but preferably is allowed to air dry. Advantageously, a coating employing a polymer of the invention may be thermally or ambiently cured. As a further aspect, the present invention relates to a shaped or formed article which has been coated with a coating compositions of the invention.

A coating composition according to the invention may comprise a polymer of the invention, water, a solvent, a pigment (organic or inorganic) and/or other additives and fillers known in the art. For example, a latex paint composition of the invention may comprise a polymer of the invention, water, a pigment and one or more additives or fillers used in latex paints. Such additives or fillers include, but are not limited to, leveling, rheology, and flow control agents such as silicones, fluorocarbons, urethanes, or cellulosics; extenders; reactive coalescing aids such as those described in U.S. Pat. No. 5,349,026; flatting agents; pigment wetting and dispersing agents and surfactants; ultraviolet (UV) absorbers; UV light stabilizers; tinting pigments; extenders; defoaming and antifoaming agents; anti-settling, anti-sag and bodying agents; anti-skinning agents; anti-flooding and anti-floating agents; fungicides and mildewcides; corrosion inhibitors; thickening agents; plasticizers; reactive plasticizers; curing agents; or coalescing agents. Specific examples of such additives can be found in *Raw Materials Index,* published by the National Paint & Coatings Association, 1500 Rhode Island Avenue, NW, Washington, D.C. 20005.

Preferably, a coating composition of the invention is a latex paint composition, the latex paint composition may be used for interior and/or exterior coatings. Preferably, a latex paint composition according to the invention contains a copolymer of a monomer of formula (I) and an ethylenically unsaturated monomer, each as described above. In a preferred embodiment, the monomer of formula (I) is 3-butene-1,2-dipropyl ester (EpBDP), 3-butene-1,2-dibutyl ester (EpBDBu), or 3-butene-1,2-di-2-ethylhexyl ester (EpBD2EH) and the ethylenically unsaturated monomer is vinyl acetate.

Another embodiment of the invention is a monomer of formula (I):

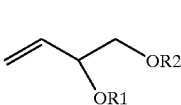

(I)

In formula (I), R1 is a $C_1$–$C_{24}$ alkyl group or an aromatic or heteroaromatic group as defined above and R2 is a —C(O) R3 group where R3 is a $C_1$–$C_{24}$ alkyl group, an aromatic or heteroaromatic group, a $C_3$–$C_8$ cycloalkyl or $C_2$–$C_7$ heterocyclic group; or a —$CH_2$—C(O)—R4 group where R4 is a $C_1$–$C_6$ alkyl group, all as defined above. Preferably, both R1 and R2 are a —C(O)—$CH_2$—C(O)—R4 group where R4 is methyl group, i.e. both R1 and R2 are an acetoacetyl group. In another preferred embodiment, R1 is a methyl group and R2 is either an acetyl group or an acetoacetyl group. Examples of suitable monomers of formula (I) include, but are not limited to, 1-acetoxy-2-methoxy-3-butene, 1-acetoacetoxy-2-methoxy-3-butene, 3-butene-1,2-dipropionate, 1,2-diacetoxy-3-butene, 3-butene-1,2-diol monoacetate, 3-butene-1,2-diacetate, and 1,2-bisacetoacetate-3-butene.

Another embodiment of the invention relates to derivatizing a polymer of the invention to form an enamine functional polymer. In an enamine functional polymer, the enamine functionality serves to stabilize the acetoacetoxy-groups and protect them from hydrolysis. Enamine-functional polymers have been described in Moszner et al., Polymer Bulletin 32, 419–426 (1994); European patent Application No. 0 492 847 A2; U.S. Pat. No. 5,296,530; U.S. Pat. No. 5,484,849; U.S. Pat. No. 5,484,975; and U.S. Pat. No. 5,525,662. These documents are incorporated here by reference.

An enamine functional polymer according to the invention results from the reaction of an amine and an acetoacetoxy functionalized polymer. The acetoacetoxy functionalized polymer is the polymerization product of a monomer of formula (I):

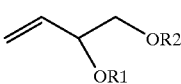

(I)

and, optionally, an ethylenically unsaturated monomer. In formula (I), R1 and R2 are, independently, hydrogen, a $C_1$–$C_{24}$ alkyl group, an aromatic or heteroaromatic group, a $C_3$–$C_8$ cycloalkyl or $C_2$–$C_7$ heterocycloalkyl group, or a —C(O)R3 group. In a preferred embodiment, both R1 and R2 are a —C(O)R3 group. R3 is a $C_1$–$C_{24}$ alkyl group, an aromatic or heteroaromatic group, a $C_3$–$C_8$ cycloalkyl or $C_2$–$C_7$ heterocyclic group, or a —$CH_2$—C(O)—R4 group where R4 is a $C_1$–$C_6$ alkyl group. In the acetoacetoxy functional polymer, in the monomers of formula (I), at least one of R1 and R2 is an acetoacetyl group. The acetoacetoxy functionalized polymer has one or more pendant acetoacetoxy moieties.

In a preferred embodiment, enamine functional polymers may be prepared by reacting an amine with an acetoacetoxy functionalized polymer as described above. The reaction stoichiometry uses at least one molar equivalent of amino (NH) groups to acetoacetoxy groups. The amine may be any amine which upon reaction with the pendant acetoacetoxy moiety or moieties of the acetoacetoxy functionalized polymer forms an enamine group. Suitable amines include, for example, ammonia, primary amines and secondary amines. Preparation of enamines from acetoacetoxy groups are described in U.S. Pat. Nos. 5,296,530, 5,484,975, and 5,525, 662 which are incorporated here by reference.

Though the reaction is rapid, an equilibrium exists between the enamine product and the acetoacetoxy/NH reactants. Although the reaction may be conducted at room temperature, the rate of enamine formation increases with temperature. Due to the equilibrium, however, an enamine functionalized polymer of the invention may have both enamine and acetoacetoxy groups.

Enamine functional polymers or copolymers may also be prepared by polymerization of enamine functional monomers. An enamine functional monomer may be prepared by the reaction of an acetoacetoxy monomer with an amine such as those described above. Polymerization of the resulting enamine functional monomer will produce an enamine functional polymer. This method of enamine polymer preparation is described Moszner et al., Polymer Bulletin 32, 419–426 (1994).

The following examples are given to illustrate the invention. It should be understood, however, that the invention is not to be limited to the specific conditions or details set forth in these examples. The examples of various coating compositions of the invention use the following materials:

LUPERSOL 575 t-amyl peroxy 2-ethylhexanoate sold by Elf Atochem North America.

QP-300 Hydroxyethyl cellulose, sold by Union Carbide Corporation.

AEROSOL OT-75 Anionic Surfactant, sold by Cytec Industries.

TERGITOL NP-40 Nonionic Surfactant, sold by Union Carbide Corporation.

RESIMENE 745 Melamine formaldehyde resin from Cytec Industries.

DESMODUR N 3300 Isocyanate of 6,6-hexane diisocyanate, sold by Bayer, Inc.

BYK 300 Flow aid, sold by Byk Chemie.

MAK Methyl Amyl Ketone, solvent available from Eastman Chemical Company.

FC-430 Fluorosurfactant (98.5% solids), sold by 3M, St. Paul, Minn.

EASTMAN PM Propylene glycol monomethyl ether, sold by Eastman Chemical Company.

TAMOL 681 is a dispersant sold by Rohm and Haas Company.

TRITON GR-7M is a surfactant sold by Union Carbide.

DEEFO 495 is a defoamer produced by Ultra Additives Inc.

TI-PURE R-900 is titanium dioxide sold by DuPont.

PROPYLENE GLYCOL is a cosolvent produced at Eastman Chemical Company.

TEXANOL is a cosolvent produced at Eastman Chemical Company.

ASP 072 is a clay-based extender pigment produced by Engelhard.

AMP 95 is a buffer sold by Angus Chemical.

The following methods were used to evaluate the coatings and films prepared according to the invention.

Methyl Ethyl Ketone Resistance

Films cured under the specified conditions were rubbed with a methyl ethyl ketone (MEK) saturated cloth according to ASTM D5402. Results are reported as the number of double rubs required for breakthrough of the film to the substrate.

Gloss

Gloss was measured on ~1 mil films coated on Bonderite 1000 pretreated steel panels using a Byk-Gardner haze-gloss meter.

Pencil Hardness

Pencil hardness was measured using a series of pencils containing leads of differing hardness according to ASTM D3363. The hardness is reported as the hardest pencil lead that does not penetrate the coating film.

Konig Pendulum Hardness

The Konig pendulum hardness is determined using a Byk-Gardner pendulum hardness tester according to ASTM D4366. Hardness is reported as the number of seconds for the pendulum swing to be damped from a 6° swing to a 3° swing.

Impact Resistance

Forward and direct impact resistance is determined using a falling dart impact tester according to ASTM D2794. Results are reported as the maximum in-lbs of force where the film remains intact.

Sodium Hydroxide Stain Test

A drop of 6 M NaOH solution was placed on the coating and covered with a microscope cover slide. After 24 hours the panel was washed with water and the coating inspected for visual damage. A coating with no visual damage passes the test.

Water Solubility

Water solubility of a monomer at room temperature was determined by shaking together equal weight amounts of monomer and water and then isolating the water layer. The water layer was then analyzed for monomer content using gas chromatography (GC).

Minimum Film Forming Temperature

Minimum film forming temperature (MFFT) is determined by casting a wet latex film with a 4-mil applicator cube on an MFFT bar set at a temperature range in which the film will coalesce during drying, pulling the edge of a brass spatula blade through the film from cold to hot end on the MFFT bar after 30 minutes, and recording the temperature at which the blade offers significant resistance to the experimenter.

Hydrolytic Stability

Hydrolytic stability was measured by means of a potentiometric titration using a Brinkman 686 Titrator equipped with a Ross combination glass electrode was used for the titrations. The basic procedure was to allow the latex to react with an excess of a strong base of 0.5 N KOH for several hours. A sample is taken at given time intervals and titrated against a strong acid of 0.5 N HCl to obtain the amount of material hydrolyzed.

A blank was prepared by taking a 5 mL sample of the latex soon after treatment with base and adding 50 mL of deionized (DI) $H_2O$. This blank measurement was used to determine if any base was immediately neutralized upon mixing, i.e. if any free acids were present in the mixture initially. The blank value was needed to correct any calculations based on titration of base during the hydrolysis. Titration of the blank should only produce one equivalence point resulting from the base added. Typical potentials were −25 mV to 25 mV. After the desired reaction time, another 5 mL sample of the latex and base mixture was taken and diluted with 50 mL of DI $H_2O$ and titrated for the presence of the following two species: the remaining strong base in the sample and the weak base produced by the hydrolysis of the ester. The excess strong base gave a first equivalence point while the weak base formed upon hydrolysis gave a second. Typical potentials were −80 mV for KOH and 200 mV for the hydrolyzed species.

Calculations
1) Equivalents of hydrolyzable species was calculated based on sample size of latex to be used, composition of latex and % solids of the latex (as a fraction).
2) For Blank titration to determine any base neutralized by sample upon mixing:

$$\text{Equivalents of Base} = eq_{base} = \frac{EP_1 * N}{1000}$$

3) For Hydrolyzed sample titrations to determine amount hydrolyzed:
   a) based on hydrolyzed weak acid ($2^{nd}$ eq. point):

$$eq_{hydrolyzed\ species} = \frac{(EP_2 - EP_1) * N}{1000}$$

b) based on excess base ($1^{st}$ eq. point):

$$eq_{hydrolyzed\ species} = eq_{base} - \left(\frac{EP_1 * N}{1000}\right)$$

where
  $EP_1$=volume of titrant at first eq. point (mL) from base
  $EP_2$=volume of titrant at second eq. point (mL) from hydrolyzed material
  N=normality of HCl titrant (N)

4) For percent hydrolyzed as the mole % of hydrolyzable ester:

$$\% \text{ hydrolyzed} = \frac{eq_{hydrolyzable\ species}}{eq_{hydrolyzed\ species}} * 100\% = \frac{calc\ 3}{calc\ 1} * 100\%$$

EXAMPLE 1

Synthesis and Purification of 1-acetoxy-2-methoxy-3-butene

In a 3-liter, 3-necked round bottom flask equipped with a mechanical stirrer, nitrogen inlet, temperature probe and vigoreux column was placed 1200 mL toluene, sodium acetate (88.59 g, 1.08 mol) and 2-methoxy-3-buten-1-ol (250.0 g, 2.45 mol). Mixture heated to 60° C. with stirring. Once temperature had stabilized, acetic anhydride (288.83 g, 2.80 mol) added dropwise over 2.5 hours. Maintained temperature for 1.5 hrs then increased temperature to 70° C. for 1 hour. Gas chromatography showed no trace of starting material in reaction. Began cooling reaction to room temperature. When reaction had cooled to 38° C., one liter of a 5% sodium bicarbonate solution was added at high speed to decompose any excess acetic anhydride remaining in the reaction. Extracted reaction twice with water, layers separated, the aqueous layer extracted twice with toluene and added to the organic layer. Organic layer dried with anhydrous magnesium sulfate, filtered and concentrated by rotovap. Yield 222.43 g (63.0%) of a clear, colorless material. $^1$H NMR consistent with 1-acetoxy-2-methoxy butene.

EXAMPLE 2

Synthesis and Purification of 1-acetoacetoxy-2-methoxy-3-butene

In a 500 mL 3-neck round bottom flask was placed 2-methoxy-3-butene-1-ol (164.46 g, 1.61 mol) and t-butyl acetoacetate (430.20 g, 2.50 mol). Reaction flask was equipped with magnetic stir bar, thermocouple, vigreaux column, and a still head with thermometer. Reaction was heated to 134° C. with stirring for 7 hours, then cooled to room temperature. Product was purified using a short-path distillation apparatus. Distillate was collected until the head temperature exceeded 67° C. NMR of the remaining material indicated the desired product. $^1$H NMR (CDCl$_3$): d 5.63–5.75 (m, 1H), 5.32–5.40 (m, 2H), 5.06 (s, 1H), 4.10–4.25 (m, 2H), 3.82–3.90 (m, 1H), 3.5 (s, 1H), 3.34 (s, 3H), 2.28 (s, 3H), 1.96 (s, 3H).

EXAMPLE 3

Copolymerization of 1-acetoxy-2-methoxy-3-butene

In a 500 mL reactor kettle was weighed Eastman PM solvent (180.0 g) and heated to 80° C. Vinyl acetate (216.0 g), 1-acetoxy-2-methoxy-3-butene (54.0 g), and LUPERSOL 575 (5.4 g) weighed into a 500 mL Erlenmeyer flask and pumped into the reactor over three hours. Temperature held at 80° C. for one hour after completion of addition, then LUPERSOL 575 chaser (0.5 g) was added. Temperature was maintained at 80° C. for an additional hour before cooling to room temperature. Clear resin produced at 55.43% solids out of a theoretical 60% solids formulation.

EXAMPLE 4

Copolymerization of 1-acetoacetoxy-2-methoxy-3-butene

In a 500 mL two-piece resin reactor was placed 107.7 g propylene glycol monomethyl ether and heated to 80° C. In a separate container, 80 g vinyl acetate, 40 g of 1-acetoacetoxy-2-methoxy-3-butene, 80 g vinyl 2-ethyl hexanoate, and 8.0 g LUPERSOL 575 were mixed: The monomer mixture was added to the resin reactor over a 3 hour period. After a one hour hold, 1.0 g of LUPERSOL 575 was added and the reaction held at 80° C. for an additional 1.5 hours. Resin mixture was cooled and poured out. Resin had a solids content of 60.8% and the Tg of the resin was −13° C.

EXAMPLE 5

Coating Made from Copolymer of Example 4

A clear coating formulation was prepared by mixing 29.21 g of the resin in Example 4 above with 6.0 g RESIMENE 745, 1.42 g of a solvent mixture consisting of 55% xylene, 32% methyl amyl ketone, 6.5% ethyl ethoxy propionate, 6.5% n-butanol; 0.24 g FC430, and 0.30 g p-toluene sulfonic acid. The components were mixed until homogeneous. The coating mixture was drawn down on an iron phosphate pretreated steel panel (Bonderite 1000) using a wire-wound drawdown bar. The coating was cured at 160° C. for 30 minutes. The resulting coating had 95 MEK double rubs, pencil hardness of 2B, Konig pendulum hardness of 33 seconds, forward impact resistance 160 in-lbs, reverse impact resistance 120 in-lbs.

EXAMPLE 6

Synthesis of Homopolymer

To a 300 mL round bottomed 3-neck flask equipped with a thermocouple, mechanical stirrer, condenser, and a nitrogen inlet was charged 100.00 g 3-butene-1,2-diacetate. Contents were heated with stirring to 80° C. 2.0 g of LUPERSOL 575 (t-amyl peroxy 2-ethylhexanoate) was added. The contents were held for 22 hours at 80° C. then cooled. Conversion of monomer to polymer was 65.7%. Number average molecular weight was 8100 and the weight-average molecular weight was 13100 by Gel Permeation Chromatography.

EXAMPLE 7

Synthesis of Copolymer by Solution Process 107.7 g of propylene glycol monomethyl ether was charged to a 500 mL resin kettle equipped with a mechanical stirrer, nitrogen inlet, thermocouple, and condenser. The solvent was heated to 80° C. with stirring. In a separate vessel, 40 g of 1,2-diacetoxy-3-butene, 100 g vinyl acetate, 60 g vinyl-2-ethylhexanoate, and 8 g LUPERSOL 575 were mixed. The monomer mixture was fed to the heated solvent over a 3 hour period. After a one hour hold, 1 g of LUPERSOL 575 was added. The mixture was poured out after 1.5 hours. Measured % solids was 64.73%. Glass transition temperature of the polymer was −6.81° C. as measured as the midpoint in the inflection of DSC.

EXAMPLE 8

Synthesis of Copolymer by Emulsion Process

A vinyl acetate/3-butene-1,2-diacetate emulsion copolymer was prepared as follows: 248.0 g deionized water, 24.0 g of a 5% solution of QP-300, 0.45 g of AEROSOL OT-75, 19.40 g of TERGITOL NP-40, and 1.2 g sodium carbonate was charged to a 1-liter two-piece resin kettle equipped with a mechanical stirrer, thermocouple, nitrogen inlet, and condenser. The mixture was heated to 65° C. with rapid stirring. In a separate vessel, 320 g vinyl acetate and 80 g of 3-butene-1,2-diacetate were mixed. When the reactor mixture reached 65° C., 40 g of the monomer mixture was added. 1.7 g of AEROSOL OT-75 was added to the remaining monomer mixture.

Feed #2 was prepared consisting of 1.03 g of 70% aqueous solution of t-butyl hydroperoxide and 29.77 g water. Feed #3 was also prepared consisting of 0.70 g sodium formaldehyde sulfoxylate dissolved in 30.0 g water.

After holding for 10 minutes at 65° C., the following were premixed and separately added to the reactor: (1) 0.25 g of a 1% FeSO$_4$.7 H$_2$O aqueous solution and 2.0 g water; (2) 0.25 g of a 1% ETDA aqueous solution and 2.0 g water; (3) 0.51 g of a 70% aqueous t-butyl hydroperoxide solution and 4.89 g water; and (4) 0.35 g sodium formaldehyde sulfoxylate and 5.0 g water.

After holding for ten minutes at 65° C., the monomer mixture was pumped in at a rate of 1.7 g/min over 3.5 hours. Thirty minutes after the start of the monomer feed, feeds 2 and 3 were started at a rate of 0.14 g/min over 3.5 hours. Thirty minutes after the completion of feeds 2 and 3, chasers were added consisting of (1) 0.26 g of 70% aqueous t-butyl hydroperoxide and 1.94 g water, and (2) .15 g sodium formaldehyde sulfoxylate and 2.0 g water. Thirty minutes later, additional chasers were added followed by a 30 minute hold at 65° C. The latex was cooled, filtered and packaged.

This latex has a particle size of 305 nm, percent solids of 52.3, pH 5.09, viscosity of 602 cP (Brookfield viscosity @ 100 rpm). Minimum film formation temperature is 17.5° C.

EXAMPLE 9

Synthesis of Emulsion Copolymer Containing 3-butene-1,2-dipropionate

A latex was prepared using the same recipe and procedure as in Example 8, except the monomer mixture consisted of 280 g vinyl acetate and 120 g of 3-butene-1,2-dipropionate. Particle size was 301 nm, percent solids was 52.3, pH 5.13, and viscosity was 1075 cP (Brookfield viscosity @ 100 rpm). The minimum film formation temperature was 11.0° C.

EXAMPLE 10

Synthesis of Solution Copolymer of bis (acetoacetate)

To a 500 mL resin kettle equipped with a mechanical stirrer, nitrogen inlet, thermocouple and condenser, 108 g of propylene glycol monomethyl ether was added. The solvent was heated with stirring to 80° C. In a separate vessel, 40 g of 1,2-bisacetoacetate-3-butene, 80 g vinyl acetate, 80 g vinyl 2-ethyl hexanoate, and 8.0 g of LUPERSOL 575 were mixed. The monomer mixture was added to the heated solvent over a period of 3 hours. One hour after completion of the addition, 1.0 g of LUPERSOL 575 was added. After 1.5 hours the resin was cooled. Mn of the resin was 3500 by gel permeation chromatography. The glass transition temperature of the resin was −9.0° C.

EXAMPLE 11

Crosslinked Coating Using Polymer of Example 10

A clear coating formulation was prepared by mixing 29.16 g of the resin in Example 10 above with 6.0 g RESIMENE 745, 1.47 g of a solvent mixture consisting of 55% xylene, 32% methyl amyl ketone, 6.5% ethyl ethoxy propionate, 6.5% n-butanol; 0.27 g FC430, and 0.30 g p-toluene sulfonic acid. The components were mixed until homogeneous. The coating mixture was drawn down on an iron phosphate pretreated steel panel (Bonderite 1000) using a wire-wound drawdown bar. The coating was cured at 160° C. for 30 minutes. The resulting coating had over 200 MEK double rubs indicating substantial curing, pencil hardness of HB, Konig pendulum hardness of 52 seconds.

EXAMPLE 12

Preparation of Copolymer 107.7 g of propylene glycol monomethyl ether (PM) was charged to a 500 mL two-piece resin reactor fitted with a condenser, nitrogen inlet, and a mechanical stirrer. The solvent was heated to 80.0° C. In a separate vessel, 40 g of 3-butene-1,2-diol monoacetate, 80 g vinyl acetate, 80 g vinyl propionate, and 8.0 g t-amyl-peroxy-2-ethyl hexanoate (LUPERSOL 575) were charged. The monomer mixture was added to the heated solvent over a 5 hour period. After a one hour hold, 1 g of LUPERSOL 575 was added, and the reaction was held at 80° C. for an additional 1.5 hours. The resin mixture was cooled. The resulting material had a measured solids content of 60.1%, viscosity of 380 cps. No unreacted 3-butene-1,2-diol monoacetate was detected by gas chromatography. The number average molecular weight was 2600 and the weight average molecular weight was 5700 as determined by gel permeation chromatography using polystyrene standards.

EXAMPLE 13

Preparation of Copolymer 107.7 g of propylene glycol monomethyl ether (PM) was charged to a 500 mL two-piece resin reactor fitted with a condenser, nitrogen inlet, and a mechanical stirrer. The solvent was heated to 80.0° C. In a separate vessel, 30 g of 3-butene-1,2-diol monoacetate, 90 g vinyl acetate, 80 g vinyl 2-ethylhexanoate, and 8.0 g t-amyl-peroxy-2-ethyl hexanoate (LUPERSOL 575) were charged. The monomer mixture was added to the heated solvent over a 3 hour period. After a one hour hold, 1 g of LUPERSOL 575 was added, and the reaction was held at 80° C. for an additional 1.5 hours. The resin mixture was cooled. The resulting material had a measured solids content of 61.5%, viscosity of 334 cps. No unreacted 3-butene-1,2-diol monoacetate was detected by gas chromatography. The number average molecular weight was 3400 and the weight average molecular weight was 6400 as determined by gel permeation chromatography using polystyrene standards.

EXAMPLE 14

Preparation of Melamine Crosslinked Enamel

An enamel formulation was prepared as follows: To 29.27 g of the resin solution from Example 13 was added 6.0 g of RESIMENE 745, 1.36 g of a solvent blend (composed of 55% xylene, 32% methyl amyl ketone, 6.5% ethoxy ethyl propionate, and 6.5% n-butanol), 0.29 g of a 25% solution of FC430 flow control aid in methyl amyl ketone, and 0.30 g of a 30% solution of p-toluene sulfonic acid in isopropanol. The coating was applied to iron phosphate pretreated steel test panels and cured in an oven for 30 minutes at 160° C. The final coating thickness was 1.3 mils. The coating had pencil hardness of H, passed 200 MEK double rubs with no marring, Konig Pendulum hardness of 70 sec. The coating passed a sodium hydroxide stain test.

EXAMPLE 15

Preparation of Urethane Crosslinked Enamel

Since the polymer of Example 13 is dissolved in a solvent containing active hydrogen groups, this solvent needed to be replaced before crosslinking with an isocyanate functional crosslinker. Solvent was removed using a rotary evaporator with a water aspirator vacuum, followed by use of a vacuum pump. The polymer was redissolved in butyl acetate at a solids level of 65%.

The urethane coating was prepared as follows: To 18.46 g of the resin solution above was added 3.00 g DESMODUR N 3300, 0.15 g of BYK 300 flow aid, and 1.51 g of a 1% solution of dibutyl tin dilaurate in MAK. The coating was applied to iron phosphate pretreated steel test panels and cured in an oven for 45 minutes at 80° C. The final coating had thickness of 1.6 mils. Pencil hardness was B, passed 80 MEK double rubs, Konig Pendulum Hardness of 14 sec and had impact resistance of 160 in-lbs. The coating passed a sodium hydroxide stain test. The coating had a 20° gloss of 87.7 and a 60° gloss of 107.

EXAMPLE 16

Preparation of Enamine

To 5.0 g of the polymer of Example 10 was added 1.2 g of propylene glycol monomethyl ether, and 0.60 g of butyl amine. The reaction was stirred at room temperature for 30 minutes. Enamine formation was monitored by infrared spectroscopy. A small sample of the reaction mixture was coated onto a zinc selenide crystal and the solvent was allowed to evaporate. Infrared spectrum indicated an absorbance at 1650 $cm^{-1}$ indicating enamine formation.

EXAMPLE 17

Preparation of Vinyl Acetate and Epoxybutene Ester Based Latexes

Vinyl acetate and epoxybutene (EpB) diester latexes A–H were prepared according to the procedure described in Example 8. The composition of each latex of A–H is summarized in Table 1 along with their characteristics. Latexes A and B represent control polymers for the sake of comparison. Hydrolytic stability testing was performed using a potentiometric titration on latexes A–F and these results are also summarized in Table 1.

Characterization of Latex Polymers

Percent solids was determined using a CEM Labwave 9000 microwave solids analyzer. Viscosity was determined by using a Brookfield Digital Viscometer Model DVII using a #3 LV spindle at 30 rpm. Particle size was determined using a Brookhaven Instruments Corporation BI-90 Particle Sizer. Samples for differential scanning calorimetry (DSC) were prepared by drawing down a sample of latex onto release paper and allowing to air dry for one week. Unreacted monomers were determined using gas chromatography.

TABLE 1

| Vinyl Acetate and Epoxybutene (EpB) Diester Latexes | | | | | | | | |
|---|---|---|---|---|---|---|---|---|
| Example | A | B | C | D | E | F | G | H |
| Monomer Composition (Wt %) | | | | | | | | |
| Vinyl Acetate | 80 | 70 | 70 | 80 | 70 | 70 | 80 | 80 |
| Butyl Acrylate | 20 | | | | | | | |
| VEOVA-10 | | 30 | | | | | | |
| EpB Dipropionate | | | 30 | | | | | |
| EpB Dibutyrate | | | | 20 | 30 | | 20 | |
| EpB Di(2-ethyl hexanoate) | | | | | | 30 | | 20 |
| Trimethoxysilyl methacrylate | | | | | | | 0.1 | 0.1 |
| Properties | | | | | | | | |
| Percent solids | 49.70 | 50.11 | 49.86 | 50.16 | 50.33 | 50.29 | 49.48 | 49.27 |
| pH | 4.85 | 5.21 | 4.73 | 5.02 | 4.84 | 5.09 | 5.20 | 5.30 |
| Viscosity (cps) | 892 | 392 | 2344 | 1504 | 1920 | 1172 | 1504 | 1248 |
| Effective Diameter (nm) | 333 | 309 | 298 | 332 | 297 | 336 | 324 | 353 |
| Mean Diameter (nm) | 392 | 396 | 346 | 393 | 341 | 386 | 386 | 422 |
| Polydispersity | 0.215 | 0.223 | 0.192 | 0.192 | 0.162 | 0.190 | 0.147 | 0.195 |
| MFFT (° C.) visual | 8.6 | 12.5 | 10.0 | 9.9 | 5.4 | 3 | <0 | 7.2 |
| MFFT (° C.) resistance | 10.8 | 17.7 | 17.1 | 14.6 | 13.3 | 4.5 | 13.3 | 13.5 |
| Tg (° C.), DSC | 20.7 | 20.6 | 21.2 | 22.2 | 16.1 | 11.6 | 23.6 | 19.4 |

TABLE 1-continued

Vinyl Acetate and Epoxybutene (EpB) Diester Latexes

| Example | A | B | C | D | E | F | G | H |
|---|---|---|---|---|---|---|---|---|
| Unreacted monomers | | | | | | | | |
| Vinyl Acetate (ppm) | 279 | 82 | 815 | 427 | 1580 | 1884 | 31 | 595 |
| Comonomer (ppm) | ND | 54 | 702 | 148 | 2708 | 0.22% | 10 | 464 |
| Percent Hydrolyzed | | | | | | | | |
| 24 Hours | 57.8 | 14.4 | 99.0 | 83.5 | 84.8 | 17.7 | | |
| 72 Hours | 80.1 | 18.0 | 104.1 | 96.1 | 89.9 | 22.7 | | |

EXAMPLE 18

Preparation of Paint Formulations Based on Vinyl Acetate and Epoxybutene Ester Latexes Paint formulations were prepared using latexes A–F of Example 17. A paint formulation based on a commercial vinyl acetate control latex (UCAR 379 available from Union Carbide of Danbury, Conn.) was also prepared. These paint formulations are summarized in Table 2. In general, each paint formulation was prepared by mixing the ingredients listed in Table 2 for each latex and coalesced using Texanol to a constant minimum film formation temperature (MFFT) as indicated in Table 2. The paint formulation based on the commercial latex was coalesced to a level recommended by the product literature. The grind and thickener mix are described as follows:

Grind

The grind was prepared by weighing and mixing the following ingredients: DI water (75.00 g), Propylene Glycol (150.00 g), TAMOL 681 (21.4 g), AMP 95 (6.0 g), and DEEFO 495 (6.0 g). Next, TI PURE-900 (675.0 g) and ENGLEHARD ASP 072 (75.0 g) were added under cowles dispersion. The resulting mixture was allowed to grind until a 7+Hegman test was passed.

Thickener Mix

A thickener mix was prepared by mixing the following components: DI water (50.00 g), Propylene Glycol (10.00 g), and SCT 275 (12.50 g).

Test Methods

The paints, coatings and films were evaluated using the following methods not described above. All samples were drawn-down and aged under conditions of constant temperature, 72° F., and 50% relative humidity. Paint formulations contained relatively low pigment levels to facilitate comparisons of relative resin performance.

Paint Viscosity

Paint or Stormer viscosity (in Krebs Units) was measured according to ASTM D-856 after 24 hours using a Brookfield KU-1 Krebs-Stormer viscometer.

Gloss

Gloss was measured according to ASTM D-523 on 6 mil (wet) thick films cast on Leneta 2C opacity paper after 24 hours using micro-Tri-Gloss meter by BYK-Gardner. The appearance of a paint surface was measured visually for smoothness and film defects such as bumps and pinholes. An "O.K." rating indicates that no obvious film defects were observed.

Blocking Resistance

Blocking resistance was determined using 6 mil (wet) films on Lenera 2C opacity paper according to ASTM D-4946 Test Method for Blocking Resistance of Architectural Paints. Block resistance data was acquired both at room temperature and at elevated temperatures for the samples. Films were dried for one day, seven days, and twenty-one days for each paint. Block resistance was determined with painted surfaces face-to-face under 1 psi pressure. Room temperature block resistance were read at one day and seven days face-to-face. The tests were numerically rated on a scale of 1 to 10. A rating of 10 represented 100% pass where the films came apart with no tack or noise, and 1 represented 100% failure where the painted surfaces flowed completely together and complete destruction of the films occured upon separation. A rating of less than 4 indicated some level of destruction of the paint surface upon separation.

Wet Block Resistance

Wet block resistance was determined the same as a blocking resistance except that both of the painted surfaces were wiped so that they were damp and then the wet film surfaces were placed face-to-face under 1 psi pressure. Wet block resistance was measured only at room temperature. Films were dried for one day, seven days and twenty-one days for each paint. Wet block resistance was read at one day and seven days. The numerical test ratings were done the same way as the block resistance. All coatings failed the wet block test.

Print Resistance

Print resistance was determined using 6 mil (wet) films on Leneta 2C opacity paper according to ASTM D-2064 Test Method for Print Resistance of Architectural Paints using a 4 psi pressure placed on top of a #6 rubber stopper which was placed on four layers of cheesecloth after the film had dried. Films were dried for one day, seven days and twenty-one days for each paint. Print resistance was acquired at room temperature. Room temperature print resistance was read after one day and seven days with paint surface-to-cheesecloth. The tests were numerically rated on a scale of 1 to 10. A rating of 10 represented a 100% pass with no demarcation of the film (cloth lifts with no print) and a 1 rating represented 100% fail (the cheesecloth is impressed in the film).

Scrub Resistance

Scrub resistance was determined following ASTM D-2486 Test Method for Scrub Resistance of Interior Latex Flat Wall Paints. The coating was applied at 7 mil (wet) thickness on Scrub Test Charts Form P121-10N and allowed to dry for seven days. The panel was placed over a shim (½ inch by 10 mil) on the Gardco Scrub Machine Model D-10V and was wet with 5 mL of DI water. Ten grams of Standardized Abrasive Type Scrub Medium was placed evenly on the scrub brush and the brush was installed on the machine over the wet panel. The test machine counter was zeroed and the test was run at the maximum test speed on the machine. After each 400 cycles, the brush was removed and 10 grams more of the scrub medium was applied evenly on the bristles. The brush was then replaced, 5 mL of DI water was placed on the panel, and the test was continued. Failure was defined as the number of cycles required to remove the paint film fully in a continuous line across the width of the shim.

Wet Adhesion Test

This procedure tests the coating's adhesion to an aged, alkyd substrate under wet, scrubbing conditions. A ten mil drawdown of a commercial Gloss alkyd paint (green Glidden Industrial Enamel) was made on Scrub Test Charts Form P121-10N. The alkyd film was allowed to age one week at ambient conditions, then baked at 110° F. for 24 hours. The panel was then aged at least one more week at ambient conditions. Panels treated in this manner were the test panels for the wet adhesion test. A 7 mil (wet) drawdown of the test paint was made over the aged alkyd panel and the panel was allowed to air dry for seven days. Constant temperature/humidity conditions were used during the drying. The test panel was cross-hatched with a razor and soaked for 30 minutes in water prior to running the wet adhesion test. The test panel was inspected for blistering and scratched with the fingernail to gauge adhesion. The wet panel was placed on a Gardco Scrub Machine, Model D-10V. Ten milliliters of a 5% "Lava" soap slurry was added and the nylon scrub brush (WG 2000NB) was passed over the scored paint film area. Water was added as needed to keep the paint film wet. The number of brushing cycles for 100% peel was noted.

TABLE 2

Composition of Formulated Vinyl Acetate-based Paints

| FORMULATION (g) | UCAR 379 | A | B | C | D | E | F |
|---|---|---|---|---|---|---|---|
| Grind | 168.07 | 168.07 | 168.07 | 168.07 | 168.07 | 168.07 | 168.07 |
| Deionized Water | 44.26 | 44.26 | 44.26 | 44.26 | 44.26 | 44.26 | 44.26 |
| Latex | 234.5 | 234.5 | 234.5 | 234.5 | 234.5 | 234.5 | 234.5 |
| Texanol | 6.3 | 4.66 | 7.64 | 5.26 | 5.88 | 1.77 | 1.47 |
| DeeFo 495 | 1 | 1 | 1 | 1 | 1 | 1 | 1 |
| Triton GR-7M | 0.25 | 0.25 | 0.25 | 0.25 | 0.25 | 0.25 | 0.25 |
| Thickener Mix | 72.5 | 72.5 | 72.5 | 72.5 | 72.5 | 72.5 | 72.5 |
| Deionized (DI) Water | 8.29 | 8.29 | 8.29 | 8.29 | 8.29 | 8.29 | 8.29 |
| 28% Ammonia | 1 | 1 | 1 | 1 | 1 | 1 | 1 |
| Total | 536.17 | 534.53 | 527.51 | 535.13 | 535.75 | 531.64 | 531.34 |
| MFFT latex with coalescent (F) vis | | <33.8 | <35.2 | <32.4 | <33.4 | <32.7 | <33.8 |
| pH of paint | 9.5 | 9.23 | 9.23 | 8.95 | 9.08 | 9.24 | 8.6 |
| Stormer Viscosity (Kreb Units) | 95 | 89 | 101 | 100 | 93 | 97 | 100 |

TABLE 3

Print Resistance (ASTM-D2064) Results

| | 1 Day Cure | | | | 7 Day Cure | | | | 21 Day Cure | | | |
|---|---|---|---|---|---|---|---|---|---|---|---|---|
| | 1 Day Weight | | 7 Day Weight | | | 1 Day Weight | | 7 Day Weight | | 1 Day Weight | | 7 Day Weight | |
| Print Resist. Sample | Avg | Std Deviation | Avg | Std Deviation | Print Resist. Sample | Avg | Std Deviation | Avg | Std Deviation | Print Resist. Sample | Avg | Std Deviation | Avg | Std Deviation |
| UCAR 379 | 4.67 | 1.15 | 4.00 | 0.00 | UCAR 379 | 6.00 | 0.00 | 4.00 | 0.00 | UCAR 379 | 6.00 | 0.00 | 4.00 | 0.00 |
| A | 2.00 | 0.00 | 2.00 | 0.00 | A | 2.00 | 0.00 | 2.00 | 0.00 | A | 2.67 | 1.15 | 2.00 | 0.00 |
| B | 2.00 | 0.00 | 0.00 | 0.00 | B | 2.00 | 0.00 | 2.00 | 0.00 | B | 2.00 | 0.00 | 2.00 | 0.00 |
| D | 2.00 | 0.00 | 2.00 | 0.00 | D | 2.00 | 0.00 | 2.00 | 0.00 | D | 2.00 | 0.00 | 2.00 | 0.00 |
| E | 2.00 | 0.00 | 2.00 | 0.00 | E | 2.00 | 0.00 | 2.00 | 0.00 | E | 2.00 | 0.00 | 2.00 | 0.00 |
| C | 2.00 | 0.00 | 2.00 | 0.00 | C | 2.00 | 0.00 | 2.00 | 0.00 | C | 2.00 | 0.00 | 2.00 | 0.00 |
| F | 0.00 | 0.00 | 0.00 | 0.00 | F | 0.00 | 0.00 | 0.00 | 0.00 | F | 2.00 | 0.00 | 0.00 | 0.00 |

TABLE 4

Block Resistance (ASTM-D4946) Results

| | 1 Day Cure | | | | 7 Day Cure | | | | 21 Day Cure | | | |
|---|---|---|---|---|---|---|---|---|---|---|---|---|
| | 1 Day Weight | | 7 Day Weight | | | 1 Day Weight | | 7 Day Weight | | 1 Day Weight | | 7 Day Weight | |
| Block Resist. Sample | Avg | Std Deviation | Avg | Std Deviation | Block Resist. Sample | Avg | Std Deviation | Avg | Std Deviation | Block Resist. Sample | Avg | Std Deviation | Avg | Std Deviation |
| UCAR 379 | 0.00 | 0.00 | 0.00 | 0.00 | UCAR 379 | 2.00 | 1.00 | 1.33 | 0.58 | UCAR 379 | 3.00 | 0.00 | 3.00 | 0.00 |
| A | 0.33 | 0.58 | 0.33 | 0.58 | A | 0.33 | 0.58 | 0.00 | 0.00 | A | 2.33 | 0.58 | 0.67 | 0.58 |

TABLE 4-continued

Block Resistance (ASTM-D4946) Results

| | 1 Day Cure | | | | | 7 Day Cure | | | | 21 Day Cure | | | |
|---|---|---|---|---|---|---|---|---|---|---|---|---|---|
| | 1 Day Weight | | 7 Day Weight | | | 1 Day Weight | | 7 Day Weight | | | 1 Day Weight | | 7 Day Weight | |
| Block Resist. Sample | Block Resist. Avg | Std Deviation | Std Deviation Avg | Std Deviation tion | Block Resist. Sample | Avg | Std Deviation | Avg | Std Deviation | Block Resist. Sample | Avg | Std Deviation | Avg | Std Deviation |
| B | 0.00 | 0.00 | 0.00 | 0.00 | B | 0.00 | 0.00 | 0.00 | 0.00 | B | 0.00 | 0.00 | 1.00 | 0.00 |
| D | 0.00 | 0.00 | 0.00 | 0.00 | D | 0.33 | 0.58 | 0.00 | 0.00 | D | 2.00 | 0.00 | 0.67 | 0.58 |
| E | 0.67 | 0.58 | 0.00 | 0.00 | E | 0.67 | 0.58 | 0.67 | 0.58 | E | 2.00 | 0.00 | 0.67 | 0.58 |
| C | 2.67 | 0.58 | 2.67 | 0.58 | C | 1.00 | 0.00 | 1.33 | 0.58 | C | 2.67 | 0.58 | 3.00 | 0.00 |
| F | 0.33 | 0.58 | 0.00 | 0.00 | F | 0.00 | 0.00 | 0.00 | 0.00 | F | 0.00 | 0.00 | 0.33 | 0.58 |

TABLE 5

Scrub Resistance (ASTM-D2486) Results

| | 1 WEEK 40° F./50% SCRUB | | 3 WEEK 40° F./50% SCRUB | | 6 WEEK 40° F./50% SCRUB | |
|---|---|---|---|---|---|---|
| Sample | Average | Std. Deviation | Average | Std. Deviation | Average | Std. Deviation |
| UCAR 379 | 2360 | 450 | 2332 | 507 | 2875 | 251 |
| A | 1269 | 123 | 579 | 17 | 1071 | 159 |
| B | 1235 | 103 | 722 | 46 | 916 | 96 |
| D | 301 | 13 | 267 | 20 | 311 | 24 |
| E | 304 | 26 | 156 | 12 | 291 | 14 |
| C | <200 | <200 | <200 | <200 | 175 | 10 |
| F | 694 | 45 | 715 | 93 | 1301 | 91 |

TABLE 6

Wet Adhesion Results
100% LOSS WET ADHESION

| | 3 Day Data | | 1 Week Data | |
|---|---|---|---|---|
| Sample | Average | Std. Deviation | Average | Std. Deviation |
| UCAR 379 | 64 | 24 | 37 | 10 |
| A | 10 | 6 | 12 | 2 |
| B | 25 | 20 | 62 | 20 |
| D | 352 | 111 | 51 | 13 |
| E | 17 | 14 | 78 | 14 |
| C | 10 | 13 | 26 | 8 |
| F | 7 | 5 | 18 | 7 |

TABLE 7

Gloss Results
GLOSS

| SAMPLE | | 20 degree | Std. Deviation | 60 degree | Std. Deviation | 85 degree | Std. Deviation |
|---|---|---|---|---|---|---|---|
| UCAR | #1 | 30.86 | 1.318 | 71.4 | 1.048 | 85.24 | 1.156 |
| | #2 | 31.2 | 0.954 | 71.62 | 0.974 | 83.9 | 0.641 |
| | #3 | 30.4 | 0.878 | 71.34 | 0.9 | 84.48 | 1.274 |
| A | #1 | 12.44 | 0.205 | 56.32 | 0.263 | 81 | 0.544 |
| | #2 | 11.86 | 0.646 | 54.92 | 1.249 | 82.32 | 0.636 |

TABLE 7-continued

Gloss Results

| SAMPLE | | 20 degree | Std. Deviation | 60 degree | Std. Deviation | 85 degree | Std. Deviation |
|---|---|---|---|---|---|---|---|
| | #3 | 11.98 | 0.682 | 55.14 | 1.363 | 81.94 | 1.406 |
| B | #1 | 21.88 | 0.587 | 64.04 | 0.68 | 82.46 | 1.573 |
| | #2 | 20.5 | 1.476 | 62.2 | 2.464 | 80.96 | 2.803 |
| | #3 | 22.74 | 1.357 | 64.36 | 1.998 | 82.66 | 1.369 |
| D | #1 | 6.04 | 0.205 | 42.8 | 1.12 | 81.92 | 1.075 |
| | #2 | 5.82 | 0.231 | 42.78 | 0.926 | 81.16 | 0.958 |
| | #3 | 6.48 | 0.24 | 45.42 | 1.33 | 81 | 0.88 |
| E | #1 | 6.46 | 0.079 | 45.46 | 0.101 | 78.32 | 0.711 |
| | #2 | 6.6 | 0.063 | 45.68 | 0.495 | 78.96 | 1.076 |
| | #3 | 7.04 | 0.135 | 46.06 | 0.634 | 78.4 | 1.357 |
| C | #1 | 5.14 | 0.079 | 41.62 | 0.519 | 82.12 | 0.835 |
| | #2 | 5.26 | 0.101 | 42.16 | 0.516 | 80.14 | 0.708 |
| | #3 | 5.64 | 0.135 | 43.62 | 0.658 | 80.98 | 0.421 |
| F | #1 | 41.46 | 1.199 | 73.88 | 0.159 | 85.22 | 1.295 |
| | #2 | 40.72 | 1.101 | 73.64 | 0.28 | 86.36 | 0.939 |
| | #3 | 40.56 | 1.149 | 74.12 | 0.511 | 85.76 | 1.372 |

TABLE 8

Gloss Appearance Results

| Sample | Appearance (Glos Panels) | | |
|---|---|---|---|
| UCAR 379 | O.K. | O.K. | O.K. |
| A | O.K. | O.K. | O.K. |
| B | Pinholes | Pinholes | Pinholes |
| D | O.K. | O.K. | O.K. |
| E | O.K. | O.K. | O.K. |
| C | O.K. | O.K. | O.K. |
| F | O.K., but Very Tacky | O.K., but Very Tacky | O.K., but Very Tacky |

The claimed invention is:

1. An enamine functional polymer comprising the reaction product of an acetoacetoxy functionalized polymer and an amine selected from the group consisting of ammonia, a primary amine, and a secondary amine, wherein said acetoacetoxy polymer comprises the free-radical polymerization product of:

a monomer of formula (I):

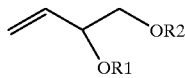

(I)

where R1 and R2 are both a —C(O)R3 group;
R3, which can be the same or different, is selected from the group consisting of a $C_1$–$C_{24}$ alkyl group, an aromatic or heteroaromatic group, a $C_3$–$C_8$ cycloalkyl or $C_2$–$C_7$ heterocyclic group, and a —$CH_2$—C(O)—R4 group;
R4 is a $C_1$–$C_6$ alkyl group;
wherein at least one of R1 and R2 is an acetoacetoxy group;
and an ethylenically unsaturated monomer.

2. A polymer of claim 1, wherein the ethylenically unsaturated monomer is at least one selected from the group consisting of an allylic compound, a vinylic compound, a styrenic compound, an α,β-unsaturated compound, an acrylic compound, and an alkene.

3. A coating composition comprising the polymer of claim 1, water, a solvent, a pigment and, optionally, an additive or a filler.

4. A coating composition of claim 3, wherein said coating composition is a paint, an architectural coating, a maintenance coating, an industrial coating, an automotive coating, a textile coating, an ink, an adhesive, or a coating for paper, wood, or plastic.

5. A method of preparing the enamine functional polymer of claim 1, comprising the step of reacting an amine selected from the group consisting of ammonia, a primary amine and a secondary amine, and the free-radical polymerization product of:

a monomer of formula (I):

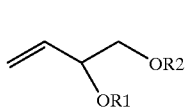

(I)

where R1 and R2 are both a —C(O)R3 group;
R3, which can be the same or different, is selected from the group consisting of a $C_1$–$C_{24}$ alkyl group, an aromatic or heteroaromatic group, a $C_3$–$C_8$ cycloalkyl or $C_2$–$C_7$ heterocyclic group, and a —$CH_2$—C(O)—R4 group;
R4 is a $C_1$–$C_6$ alkyl group;
wherein at least one of R1 and R2 is an acetoacetoxy group; and an ethylenically unsaturated monomer.

6. A coated article comprising a substrate coated with a coating composition of claim 3.

7. A coated article of claim 6, wherein said substrate is selected from the group consisting of paper, plastic, steel, aluminum, wood, gypsum board, and primed or unprimed galvanized sheeting.

* * * * *

UNITED STATES PATENT AND TRADEMARK OFFICE
CERTIFICATE OF CORRECTION

PATENT NO. : 6,160,057
DATED : December 12, 2000
INVENTOR(S) : Dean Charles Webster et al.

Page 1 of 1

It is certified that error appears in the above-identified patent and that said Letters Patent is hereby corrected as shown below:

<u>Title page, item [57],</u>
<u>Abstract,</u>
Line 9, delete "a" (second occurrence).
Line 10, after "can", insert -- be --; and delete "of" and insert -- or --.
Line 14, change "lease" to -- least --.

Signed and Sealed this

Second Day of October, 2001

Attest:

NICHOLAS P. GODICI
Attesting Officer
Acting Director of the United States Patent and Trademark Office